No. 742,427. PATENTED OCT. 27, 1903.
T. HILL.
DUMPING VEHICLE.
APPLICATION FILED MAR. 20, 1903.
NO MODEL.

WITNESSES:
Gustave Dieterich
Edwin H. Dieterich

INVENTOR
Thomas Hill
BY
Chas. C. Gill
ATTORNEY

No. 742,427. Patented October 27, 1903.

UNITED STATES PATENT OFFICE.

THOMAS HILL, OF JERSEY CITY, NEW JERSEY.

DUMPING-VEHICLE.

SPECIFICATION forming part of Letters Patent No. 742,427, dated October 27, 1903.

Application filed March 20, 1903. Serial No. 148,688. (No model.)

*To all whom it may concern:*

Be it known that I, THOMAS HILL, a citizen of the United States, and a resident of Jersey City, in the county of Hudson and State of New Jersey, have invented certain new and useful Improvements in Dumping-Vehicles, of which the following is a specification.

The invention relates to improvements in dumping-vehicles; and it consists in the novel features of construction and arrangement and combinations of parts hereinafter described, and particularly pointed out in the claims.

The invention pertains more particularly to certain improvements to be used in connection with the invention described and claimed in the Letters Patent of the United States No. 699,169, granted to Thomas Hill on May 6, 1902, for improvements in dumping-vehicles; and the object of the present invention is to provide, in combination with the features referred to in said patent, semi-elliptic springs suspended below the shafts or the booms and adapted to receive the axle for the wheels of the vehicle.

The invention will be fully understood from the detailed description hereinafter presented, reference being had to the accompanying drawings, in which—

Figure 1:
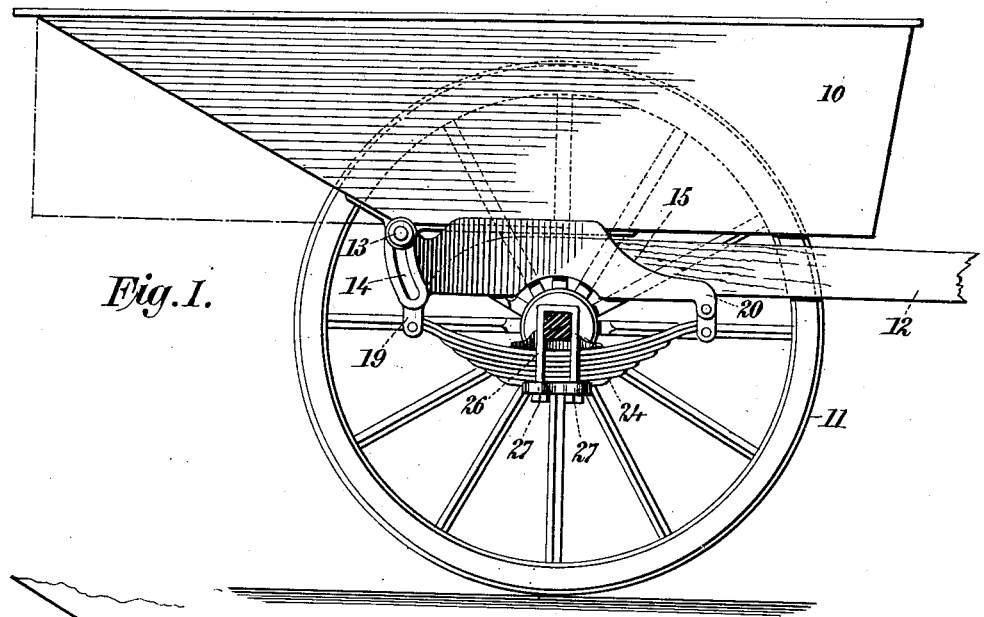
Figure 2:
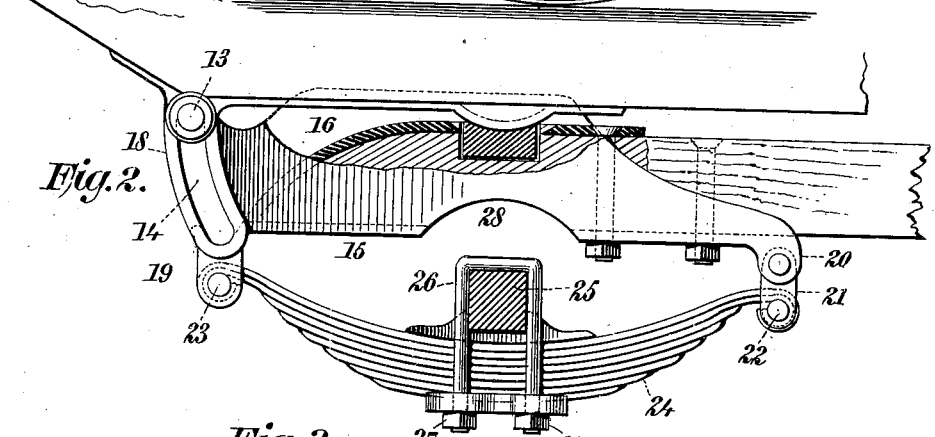
Figure 3:
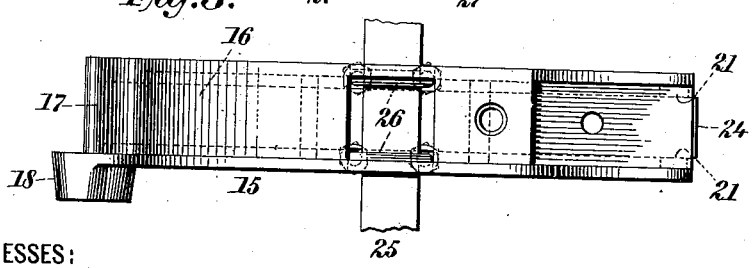

Figure 1 is a side elevation, partly broken away and partly in section, of a cart constructed in accordance with and embodying the invention, the dotted line showing that a box-like body may be employed in lieu of the usual cart-body having an inclined rear end. Fig. 2 is an enlarged side elevation, partly broken away and partly in section, of a portion of same; and Fig. 3 is a top view, partly broken away, of a portion of same.

In the drawings, 10 designates the body of the vehicle, 11 the wheels therefor, and 12 the shafts or booms, these shafts or booms 12 in the construction of a cart extending forwardly to a sufficient extent to constitute shafts for the horse; but in other classes of vehicles the said booms constituting a part of the bed or frame form, with the wheels, axles, and other parts, the running-gear. Upon the lower surface of the body 10 is secured a transverse shaft 13, whose ends constitute trunnions to engage the walls of the slots 14, formed in the rear ends of the frames 15, secured to said booms 12. The frames 15 are substantially of the form and construction shown and described in my aforesaid Letters Patent No. 699,169, and they are secured upon the rear ends of the booms 12, and each is formed in one integral piece with the curved vehicle-bearing portion 16, upon which the vehicle-body may roll during its dumping action, the bearing 17 at the lower end of the curved portion 16 for the ends of the shaft 13, and the offset frame 18, containing the slot 14 for the ends of the shaft 13, the lower end of said slot 14 being in line with the said bearing 17. The frames 15 in the present instance have at their rear and front ends the depending arms, (numbered, respectively, 19 20,) and the said arms 20 pivotally receive the upper ends of the depending plates 21, carrying a pin 22, while the depending arms 19 carry a pin 23. Upon the pins 22 23 are secured a semi-elliptic spring 24, this spring being suspended below the frame 15 and receiving upon its upper central surface the axle 25 for the wheels 11. The rear ends of the springs 24 are fastened upon the pins 23, so that they may not yield rearwardly, and the front ends of the springs 24 are connected with the pins 22, and the latter are carried by the pivoted plates 21, so that the front ends of the springs 24 may under compression yield forwardly, the purpose of thus mounting the springs 24 being to prevent the load, when the cart is traveling over rough surfaces, from being thrown upon the horse. The axle 25 is strapped upon the springs 24 by means of inverted-U-shaped bolts 26, which pass downwardly over said axle and thence through plates arranged at the upper and lower surfaces of the springs 24, said bolts 26 passing along the opposite vertical sides of the springs 24 and receiving securing-nuts 27 upon their lower ends. The lower portions of the frames 15 and booms 12 will be cut away, as at 28, so as to afford adequate room for the vertical movement of the body 10 and booms 12 under the compression and action of the springs 24.

The present invention does not dispense with the devices described and claimed in my aforesaid Letters Patent No. 699,169, but results in a variation of the construction of the same and in a disposition of the springs and axle below the booms and their frames, the purpose being to provide an improved construction, one in which there may be an abundant spring action and in which the springs may be directly connected with the axle for the wheels and be permitted to yield forwardly during the travel of the vehicle over rough surfaces.

What I claim as my invention, and desire to secure by Letters Patent, is—

1. The dumping-vehicle comprising the body 10 having the laterally-projecting trunnions, combined with the side booms or frames 12, the frames 15 on the rear ends thereof and comprising the body portion, the downwardly-turned bearing portion 16 and slotted portion 18 to receive said trunnions, the springs 24 suspended below said frames, and the axle 25 for the wheels secured to said springs; substantially as set forth.

2. The dumping-vehicle comprising the body 10 having the laterally-projecting trunnions, combined with the side booms or frames 12, the frames 15 on the rear ends thereof and comprising the body portion, the downwardly-turned bearing portion 16 and slotted portion 18 to receive said trunnions, the springs 24 suspended below said frames, and the axle 25 for the wheels secured to said springs, the said springs 24 being fixed at their rear ends and adapted to yield longitudinally at their front ends; substantially as set forth.

3. The dumping-vehicle comprising the body having the laterally-projecting trunnions, combined with the side frames or booms, the frames 15 at the rear ends thereof and comprising the body portion, the curved bearing portion 16, the slotted portion 18 to receive said trunnions, and the depending end arms 19, 20, the pivoted plates 21 connected with said arms 20, the springs 24 secured to said arms 19, and to said pivoted plates 21, and the main axle 25 secured to said springs 24; substantially as set forth.

4. The dumping-vehicle comprising the body 10 having the laterally-projecting trunnions, combined with the side booms or frames 12 having at their rear ends the downwardly-turned bearing-surfaces 16 and slots 14 to receive said trunnions, the springs 24 suspended below said side booms, and the axle 25 for the wheels secured to said springs; substantially as set forth.

Signed at New York, in the county of New York and State of New York, this 19th day of March, A. D. 1903.

THOMAS HILL.

Witnesses:
ARTHUR MARION,
CHAS. C. GILL.